United States Patent [19]
Heyl

[11] Patent Number: 5,078,435
[45] Date of Patent: Jan. 7, 1992

[54] SELF-ALIGNED FLANGED COUPLING

[75] Inventor: Robert D. Heyl, Williamsport, Pa.

[73] Assignee: The Young Industries, Inc., Muncy, Pa.

[21] Appl. No.: 638,770

[22] Filed: Jan. 8, 1991

[51] Int. Cl.⁵ .............................................. F16L 23/00
[52] U.S. Cl. ................................... 285/349; 285/368; 285/416
[58] Field of Search ............... 285/363, 368, 918, 286, 285/416, 413, 414, 400, 363, 368, 918, 286, 349, 412

[56] References Cited

U.S. PATENT DOCUMENTS

| | | | |
|---|---|---|---|
| 462,894 | 11/1891 | Dinsmore | 285/414 |
| 1,309,146 | 7/1919 | Mann | 285/368 |
| 3,322,444 | 5/1965 | Sewell et al. | 285/363 X |
| 3,339,950 | 9/1967 | Grove | 285/363 |
| 4,003,590 | 1/1977 | Gefel | 285/368 X |
| 4,185,841 | 1/1980 | Brundage | 285/918 X |
| 4,487,765 | 3/1981 | Kaiser | 285/349 X |
| 4,826,220 | 5/1989 | Ross | 285/363 |

Primary Examiner—Dave W. Arola
Assistant Examiner—Timothy Aberle
Attorney, Agent, or Firm—Lalos & Keegan

[57] ABSTRACT

A self-aligned flanged coupling for a pair of product transport pipes comprising a male member, a female member disposable in coupling relation to the male member, a clamping assembly mating with the male and female members for releasably securing the members, and an O-ring for disposed between the male and female members, wherein the male member comprises a first pipe, an annular flange for receiving the O-ring extending outwardly and circumferentially about the outer diameter of the first pipe and secured to the pipe having a recess disposed therein to receive the O-ring, wherein the pipe extends beyond the annular flange, wherein the female member comprises a second pipe, a support extending outwardly and circumferentially about the outer diameter of the second pipe, wherein the support extends beyond the second pipe, and a flanged portion extending outwardly from the second pipe and secured to the support having an orifice therein also adapted to receive the O-ring, wherein the O-ring is disposed within the recess of the annular flange of the male member and against the support of the female member and the male member pipe.

8 Claims, 1 Drawing Sheet

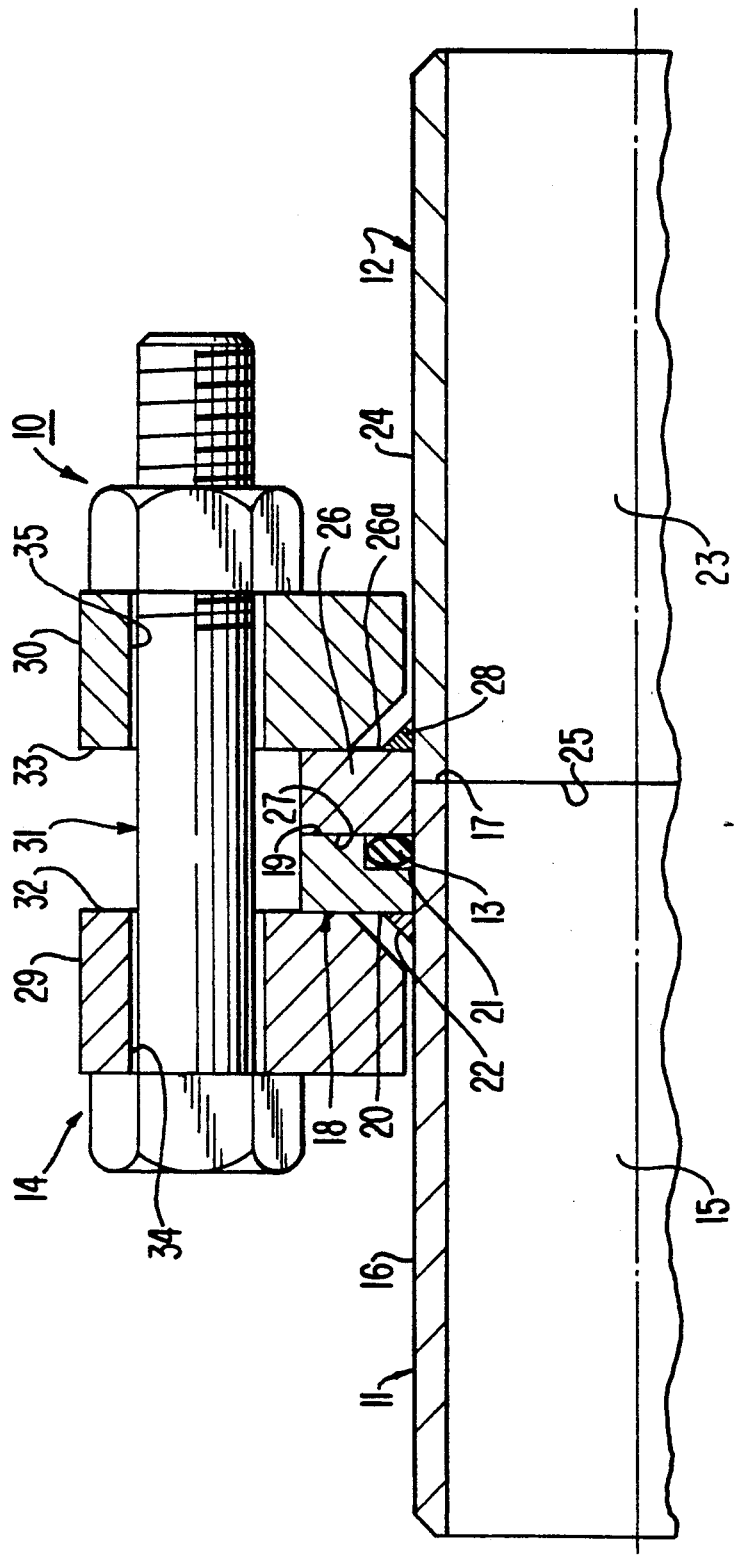

SELF-ALIGNED FLANGED COUPLING

BACKGROUND OF THE INVENTION

This invention relates to systems for transporting fluid or dry, free flowing materials and more particularly to an improved coupling arrangement for pipe sections, elbows and fittings of conveying lines used in such systems.

In systems for transporting fluid or dry, free flowing materials, there usually is provided one or more conveying lines made up of a plurality of pipe sections, elbows and fittings connected together. Typically such components have been connected together by welding, threaded fittings, bolted flanges or a variety of compression or banding couplings. Such coupling arrangements, however, have been found not to be entirely satisfactory for such systems. In particular, it has been found that such arrangements have not been readily conducive to ease of disassembly and reassembly for inspection, cleaning or maintenance purposes, or effective in providing smooth, continuous internal surfaces to facilitate the flow of material therethrough and prevent the lodging of material in crevices located in component joints, fluid tight seals between adjoining components to prevent a pressure loss in the conveying line and a suitable shielding of the sealing means disposed between adjoining components from the material being conveyed to prevent seal erosion caused by product abrasion.

Accordingly, it is the principal object of the present invention to provide an improved coupling arrangement for adjoining components of a fluid or dry, free flowing material conveying line.

Another object of the present invention is to provide an improved coupling arrangement for adjoining components of a fluid or dry, free flowing material conveying line of a material transporting system.

A further object of the present invention is to provide an improved coupling arrangement for adjoining components of a fluid or dry, free flowing material conveying system, including pipe sections, elbows and fittings.

A still further object of the present invention is to provide an improved coupling arrangement for adjoining components of a conveying line of a material transporting system in which such couplings may be readily disassembled and reassembled for inspection, cleaning or maintenance purposes.

Another object of the present invention is to provide an improved coupling arrangement for adjoining components of a conveying line of a material transport system which provides a fluid tight seal between adjoining components for preventing a pressure loss in the line.

A further object of the present invention is to provide an improved coupling arrangement for adjoining components of a conveying line of a material transport system in which the sealing means between adjoining components of the line are shielded from the product being conveyed thus preventing seal erosion caused by product abrasion.

A still further object of the present invention is to provide an improved coupling arrangement for adjoining components of a material conveying line in which there is provided smooth, continuous internal surfaces in adjoining components, devoid of any crevices in which product might lodge to inhibit the free flow of the material being conveyed.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIGURE 1 is a vertical cross-sectional view of a coupling between a pair of adjoining components of a fluid or dry, free flowing material conveying line, embodying the present invention.

DESCRIPTION OF THE PREFERRED EMBODIMENTS

Referring to the drawing, there is illustrated a coupling 10 embodying the present invention which generally includes a male pipe member 11, a female pipe member 12, a sealing means 13 and a clamping assembly 14. Pipe member 11 is of a type for conveying fluids or dry, free flowing materials and includes an inner cylindrical surface 15, an outer cylindrical surface 16 and an annular mating end surface 17. Rigidly secured on outer cylindrical surface 16 of pipe member 11 is an annular flange member 18. Such flange member includes a mating surface 19 disposed substantially radially relative to the axis of pipe member 11 and displaced axially from mating end surface 17, and an annular abutment surface 20. The radially inwardly disposed portion of flange mating surface 19 is provided with an annular recess 21 in which the sealing means consisting of an O-ring is seated. Preferably, annular flange 18 is welded to pipe member 16 as shown at 22.

Female pipe member 12 includes an inner cylindrical surface 23 having a diameter substantially the same as inner cylindrical surface 15 of pipe member 11, an outer cylindrical surface 24 having substantially the same diameter of the outer surface of pipe member 11 and an annular, end mating surface 25 which is adapted to engage with annular mating end surface 17 of pipe member 11 when the pipe members are axially aligned as shown in FIGURE 1. Female pipe member 12 further includes an annular flange 26 rigidly connected thereto. Annular flange 26 is provided with a mating surface 27 which is disposed substantially radially relative to the axis of pipe member 12 and parallel to annular end surface 25, and which is displaced axially, forwardly of annular end surface 25. The spacing of mating surface 27 relative to end surface 25 is substantially the same as the spacing between mating surface 19 and end surface 17 of pipe member 11 so that when annular, mating end surface 17 of pipe member 11 engages annular, mating end surface 25 of pipe member 12 in axially aligned, coupling relation, annular flange mating surface 19 will engage annular mating surface 27. Preferably, annular flange 26 also is secured to pipe member 12 by welding as shown at 28.

Sealing means 13 preferably consists of an O-ring formed of any suitable sealing material such as BUNA N or VITRON, preferably having a hardness in the range of 70 to 75 durometer. The O-ring is of a sufficient diameter so that upon positioning the pipe members in coupling relation as described, the O-ring will contort and engage the surfaces of recess 21, pipe member 11 and annular flange 26 to provide a fluid tight seal between the coupled pipe members and the exterior.

The clamping assembly consists of a pair of clamping rings 29 and 30 and a set of bolt and nut fasteners 31. Clamping ring 29 is adapted to be mounted on pipe member 11 and is provided with an inner surface 32 adapted to engage abutment surface 20 of annular flange 18. Similarly, clamping ring 30 is mounted on pipe member 12 and includes an inner annular surface 33 adapted to engage abutment surface 26a of annular flange 26. Clamping ring 29 further is provided with a set of circumferentially spaced bolt receiving openings 34 which are adapted to register with a similar set of circumferentially spaced bolt receiving openings 35 in clamping ring 3 to receive the bolts of fasteners 31 therethrough in the conventional manner. To avoid interference with welds 22 and 28, the inner edges of the clamping rings are beveled as shown in the drawing.

In the manufacture of the components of the coupling, the clamping rings are first mounted on the pipe members and positioned away from the end surfaces thereof. The annular flanges are then mounted on the ends of the pipe members in the positions as described and welded to the pipe members. The O-ring is then installed on the male member by mounting it on the free end of the pipe member and rolling or sliding it axially into recess 21 of annular flange 18. To couple a pair of pipe members together as when forming a string of pipe sections in a system for conveying a fluid or dry, free flowing material, the leading end of each male member is inserted into annular flange 26 of a successive trailing end portion of a female member to position the two pipe members in axial alignment. The openings in the clamping rings are then aligned and the bolts are inserted therein and secured by a set of nuts in the conventional manner. As the bolt fasteners are applied and tightened, mating end surface 17 of pipe member 11 will engage mating end surface 25 of pipe member 24 so that inner cylindrical surfaces 15 and 23 of the pipe members will be in axial alignment, and annular flange mating surface 19 will engage annular mating surface 27 to compress and distort O-ring 23 to provide a fluid tight seal between the pipe members and the interior of the pipe members with the exterior. With the pipe members disposed in such coupling relation, product conveyed through the pipe members will flow freely and will not become lodged in any recess between the coupled pipe members. Furthermore, with the sealing means being displaced from the immediate juncture of the pipe members, such sealing means will be shielded from any abrasive or other deleterious action of the product being conveyed. Simultaneously, the sealing means will provide an effective sealing action between the coupled pipe members and will have a prolonged service life.

Whenever it is desired to disassemble a string of such pipes for removing a product blockage or for routine inspection, cleaning or maintenance purposes, the coupling may be disassembled merely by removing the bolt fasteners and physically separating the adjoining pipe members. When it is then desired to recouple the pipe members, the procedure as previously described is repeated. It thus will be seen that a simple coupling arrangement is provided which provides for a simple coupling and uncoupling operation, a coupling which does not interfere with the flow of material therein during operating conditions and which provides for an effective and long-lasting seal to enhance the operation of the entire system.

It is anticipated that the present invention be used on one-half inch diameter and larger pipes, and on all type of pipes including tubing, plastic pipe, and all materials suitable for pipe or tubing. Although the embodiment of the invention described related to the union of two adjoining pipe sections, it is to be understood that a similar description applies to the joining together of a pipe section and an elbow or fitting, a pair of elbows, a pair of fittings or an elbow and a fitting.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

I claim:

1. A coupling for a pair of adjoining components of a material conveying line comprising:
    a male member having an outer cylindrical surface and an annular mating end surface;
    a female member having an outer cylindrical surface and an annular mating end surface adapted to engage the annular mating end surface of said male member when the members are disposed in axially aligned, coupling relation;
    a first annular flange rigidly secured to the outer cylindrical surface of said male member, said first annular flange having a mating surface spaced axially inwardly from the mating end surface of said male member, said mating surface of said first annular flange having an annular recess disposed at a radially inward end thereof;
    annular sealing means disposed on the cylindrical surface of said male member and disposed in the annular recess of said first annular flange;
    a second annular flange rigidly secured to the outer cylindrical surface of said female member, said second annular flange having a mating surface spaced axially outwardly from the mating end surface of said female member for receiving an end portion of said male member therein whereby said annular mating end surface of said male member is in abutting relationship with said annular mating end surface of said female member to provide a continuous internal surface facilitating the flow of material therein, said mating surface of said second annular flange being spaced from the mating end surface of said female member sufficiently whereby upon engagement of the mating end surfaces of said members, said mating surface of said second annular flange will engage and compress said sealing means to provide a fluid tight seal between said annular flanges and said male member; and
    means for clamping said annular flanges together in coupling relation.

2. A coupling according to claim 1 wherein the mating surface is of said annular flanges are disposed substantially radially relative to the axes of said members.

3. A coupling according to claim 1 wherein said annular flanges are welded to the outer cylindrical surfaces of said members.

4. A coupling according to claim 1 wherein the axial dimension between the mating surface of said first annular flange and the mating end surface of said male member is substantially the same as the axial dimension between the mating surface of said second annular flange and the mating end surface of said female member.

5. A coupling according to claim 1 wherein said sealing means comprises an O-ring.

6. A coupling according to claim 1 wherein said clamping means includes a pair of ring members, each of said ring members being mounted on a respective one of said male and female members and being engageable with each respective said annular flange, and means for securing said ring members together.

7. A coupling according to claim 6 wherein said securing means comprises a set of bolt and nut fasteners.

8. A coupling according to claim 5 wherein said O-ring is formed of a material having a hardness in the range of 70 to 75 durometer.

* * * * *